United States Patent
Guille et al.

(10) Patent No.: US 8,940,126 B2
(45) Date of Patent: Jan. 27, 2015

(54) METHOD FOR PRODUCING A STIFFENER ON A SURFACE OF AN ELEMENT TO BE STIFFENED

(75) Inventors: Florent Guille, Nantes (FR); Gregory Leroux, Nantes (FR); Claude Bretecher, Bouguenais (FR)

(73) Assignee: Airbus Operations SAS, Toulouse (FR)

( * ) Notice: Subject to any disclaimer, the term of this patent is extended or adjusted under 35 U.S.C. 154(b) by 603 days.

(21) Appl. No.: 12/921,570

(22) PCT Filed: Mar. 11, 2009

(86) PCT No.: PCT/FR2009/050402
§ 371 (c)(1),
(2), (4) Date: Jan. 4, 2011

(87) PCT Pub. No.: WO2009/122058
PCT Pub. Date: Oct. 8, 2009

(65) Prior Publication Data
US 2011/0094663 A1    Apr. 28, 2011

(30) Foreign Application Priority Data
Mar. 14, 2008 (FR) ..................... 08 51681

(51) Int. Cl.
B32B 37/00    (2006.01)
B29C 33/50    (2006.01)
B29C 33/48    (2006.01)

(52) U.S. Cl.
CPC ............. *B29C 33/505* (2013.01); *B29C 33/485* (2013.01); *B29C 33/50* (2013.01)
USPC ............................ 156/307.1; 156/29; 264/257

(58) Field of Classification Search
CPC ...... B29C 33/485; B29C 33/50; B29C 33/505
USPC ........... 156/155, 210, 285, 169, 307.1, 307.5, 156/307.7, 289, 292; 264/257, 258, 554
See application file for complete search history.

(56) References Cited

U.S. PATENT DOCUMENTS 5,057,174 A * 10/1991 Anderson et al. ............. 156/155
5,387,098 A    2/1995 Willden
(Continued)

FOREIGN PATENT DOCUMENTS

| FR | 2576546 A1 | 8/1986 |
| FR | 2898539 A1 | 9/2007 |

(Continued)

OTHER PUBLICATIONS

"Table B.6 Room-Temperature Linear Coefficient of Thermal Expansion Values for Various Engineering Materials" from stormcable.com date unknown.*
Print out of "http://www.stormcable.com/uploads/thermal_expansion_date_table_tb06.pdf" taken from archive.org taken from stormcable.com displaying the pdf of "Table B.6 Room-Temperature Linear Coefficient of Thermal Expansion Values for Various Engineering Materials" was available on stormcable.com as of Jan. 14, 2005.*

(Continued)

*Primary Examiner* — John Goff
(74) *Attorney, Agent, or Firm* — Young & Thompson

(57) ABSTRACT

A method for the production of a stiffener on a surface of an element that is to be made rigid, whereby at least one of the two is made of a composite material that is not completely polymerized, whereby the stiffener includes—in a transverse direction—two contact zones with the surface between which the stiffener and the element to be made rigid form a cavity that empties out at least one of the ends of the stiffener, includes using a core that is placed in the cavity and removed from the cavity after polymerization. The core has a first part that has a low expansion coefficient to ensure the geometric precision required and at least one second part that has a significant elongation coefficient to make possible the extraction of the part by traction on one of the ends of the second part so as to cause a contraction of its cross-section.

18 Claims, 2 Drawing Sheets

(56) References Cited

U.S. PATENT DOCUMENTS

| | | | |
|---|---|---|---|
| 5,547,629 A | 8/1996 | Diesen et al. | |
| 2001/0038170 A1* | 11/2001 | Buge et al. | 264/510 |
| 2005/0230552 A1* | 10/2005 | Engwall et al. | 244/133 |
| 2008/0029644 A1 | 2/2008 | Martinez Cerezo et al. | |

FOREIGN PATENT DOCUMENTS

| | | |
|---|---|---|
| GB | 1522432 A | 8/1978 |
| WO | 2005105402 A1 | 11/2005 |
| WO | 2008003721 A1 | 1/2008 |

OTHER PUBLICATIONS

"Tech Data Rohacell 51 Polymethacrylimide (PMI) Rigid Foam Sheet" from archive.org taken from emkayplastics.co.uk Dec. 13, 2002.*

"NASA Technical Memorandum" from ntrs.nasa.gov published Jul. 1985.*

French International Search Report, dated Sep. 3, 2009, from corresponding PCT application.

* cited by examiner

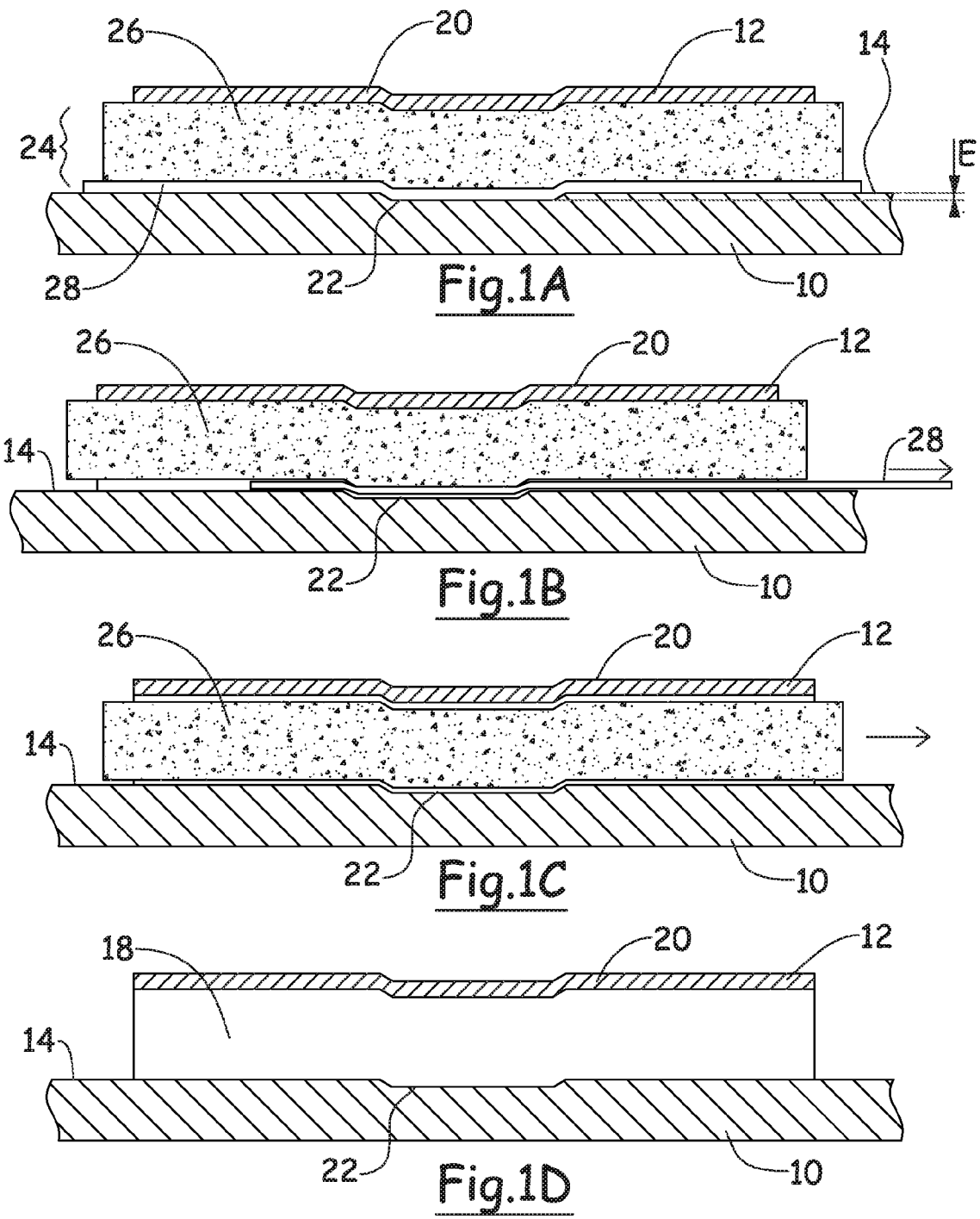

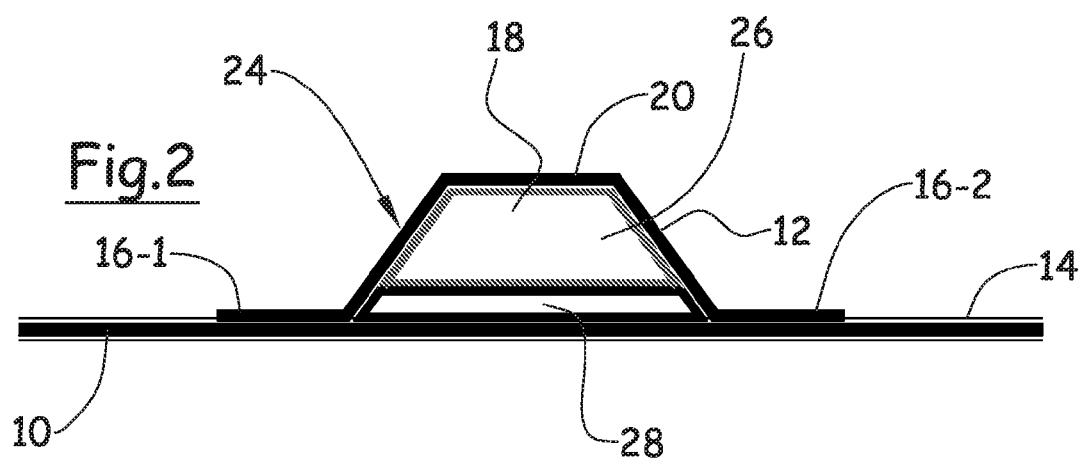
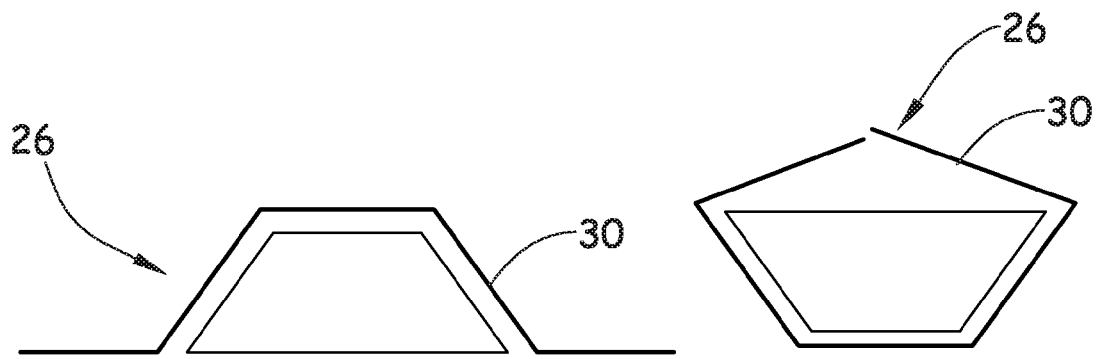

METHOD FOR PRODUCING A STIFFENER ON A SURFACE OF AN ELEMENT TO BE STIFFENED

This invention relates to a method for the production of a stiffener that is scooped out in the shape of an omega as well as a core for the implementation of the method.

In the aeronautical field, stiffeners are used in order to enhance the mechanical characteristics of certain elements, such as, for example, the panels that form the fuselage.

When the element that is to be made rigid and the stiffener are metal, they are assembled after having been shaped, for example by riveting or bonding.

In order to reduce the onboard weight, the metal elements tend to be replaced by elements that are made of composite material.

According to a technique for assembling elements that are made of composite material, a core is inserted between the element to be made rigid and the stiffener that are not polymerized at the time of the installation of the core but during the same cycle.

This core is necessary to keep the elements that are not yet rigid in the desired position until polymerization takes place.

According to a first technique that is described in the document FR-2,576,546, the core is made from an agglomerate of sand and a binder that consists of a formophenolic resin that is polymerized with a hardener such as a diisocyanate, in the presence of a catalyst such as a preferably liquid amine. After the creation of the part around the core, the latter is broken up by means of an organic solvent.

This solution is not fully satisfactory because the core is not reusable and is to be destroyed with each part made. Furthermore, its destruction generates waste that is difficult to recycle or dispose of.

The documents U.S. Pat. No. 5,387,098 and U.S. Pat. No. 5,547,629 describe reusable cores.

The document U.S. Pat. No. 5,387,098 describes a flexible core with a constant cross-section that is able to adapt to a rib that has a curved profile. It comprises a case made of flexible material, in particular silicone, in which leaves of flexible material are placed on top of one another. As appropriate, the leaves can all be of the same material or have different materials to obtain the desired expansion coefficient.

According to this document, all of the leaves are connected to one another using pins that prevent any relative movement between the leaves in a longitudinal direction.

The document U.S. Pat. No. 5,547,629 describes the use of a core that can be reused for making a helicopter propeller profile. According to this document, each cavity comprises a single rubber core.

In the two cases, after polymerization, the cores are withdrawn by pulling on one of their ends.

The traction of the core causes a contraction of its cross-section that makes it easy to remove it from the cavity.

Even if they are reusable, theses cores are not completely satisfactory because the core has to be made of a material with a relatively high elongation coefficient to facilitate its removal. This type of material, however, tends to have an expansion coefficient that does not make it possible to obtain the required dimensional details. On the contrary, if a material is selected for the core that makes it possible to obtain the required dimensional details, the core may be difficult to remove from the cavity of the stiffener because of a low elongation coefficient.

Furthermore, this type of core cannot be used when the cross-section of the cavity varies, in particular when the panel to which the stiffener is added is not flat because of, for example, releases of folds.

Also, this invention aims at eliminating the drawbacks of the prior art by proposing a method for installing a stiffener that delimits a cavity using an extractable core, making it possible to ensure the required dimensional details.

For this purpose, the invention has as its object a method for the production of a stiffener on a surface of an element that is to be made rigid, whereby at least one of the two is made of a composite material that is not completely polymerized, whereby said stiffener comprises—in one transverse direction—two contact zones with the surface between which the stiffener and the element to be made rigid form a cavity that empties out at least one of the ends of said stiffener, consisting in using a core in several parts, placed in the cavity and removed from said cavity after polymerization, characterized in that it consists in using a core with a first part that has a low expansion coefficient to ensure the geometric precision required and at least one second part that has a significant elongation coefficient to make possible the extraction of said part by traction on one of the ends of said second part so as to cause a contraction of its cross-section.

Other characteristics and advantages will emerge from the following description of the invention, a description that is provided only by way of example, relative to the accompanying drawings in which:

FIG. 1A is a longitudinal cutaway that illustrates a core according to the invention during the polymerization of a stiffener that is added to a panel, FIG. 1B is a longitudinal cutaway that illustrates the removal of a second part by traction and contraction of said second part, FIG. 1C is a longitudinal cutaway that illustrates the removal of a first part of the core, FIG. 1D is a longitudinal cutaway of a panel to which is added a stiffener after polymerization, FIG. 2 is a transverse cutaway view that illustrates a core according to the invention during the polymerization of a stiffener added to a panel, and FIGS. 3A and 3B are transverse cutaway views of a first part of a core according to the invention illustrating the stages of its production.

In the figures, an element that is to be made rigid, hereinafter called panel and able to form a part of the fuselage of an aircraft, for example, is shown at 10, and a stiffener that is added to one of the surfaces 14 of said panel 10 is shown at 12. At least one of the two elements 10, 12 is made of composite material.

For the rest of the description, the longitudinal direction corresponds to the direction of the largest dimension of the stiffener that is parallel to the panel, whereby the transverse direction is the direction that is perpendicular to the longitudinal direction and parallel to the panel.

In a transverse direction, the stiffener 12 comprises two zones 16.1 and 16.2 for contact with the surface 14 between which the stiffener 12 and the panel form a cavity 18. This cavity 18 empties into at least one of the ends of the stiffener 12. According to one embodiment illustrated in FIGS. 1A to 1D, the cavity empties into the two ends of the stiffener 12.

According to one embodiment, the stiffener has an Omega profile along a transverse cutaway, namely in the shape of a U that is upside-down and tapered with a flange on both sides that forms the contact zones with the surface 14, as illustrated in FIG. 2.

As appropriate, the panel 10 can have a flat or curved profile.

Preferably, when the panel 10 is not flat, the upper portion 20 of the stiffener is not flat and follows the profile of the panel.

In FIGS. 1A to 1D, the panel 10 has a hollow shape 22, called an undercut shape below, at the surface 14. By way of example, this undercut shape 22 can arise from a release of folds, namely a reduction in the number of folds forming the panel at certain zones of the panel.

As appropriate, the panel 10 and/or the stiffener 12 can have undercut shapes 22.

According to a first solution, the stiffener 12 is installed on the panel 10, and the two elements 10 and 12 are polymerized during the same cycle.

According to another solution, the stiffener 12 is installed on the panel 10 whereas one of the two elements is already at least partially polymerized.

In all cases, before the stiffening of the latter element 10 or 12 by polymerization, a core 24 is inserted between the stiffener 12 and the panel 10 in the cavity 18 so as to ensure the geometry of the stiffener after polymerization.

According to the invention, the core 24 comprises a first part 26 that has a small expansion coefficient, less than the expansion coefficient of the material of the stiffener, to ensure the required geometric precision, and at least a second part 28 that has a significant elongation coefficient, greater than or equal to 600%, to allow the extraction of said part 28.

By way of example, in the case of a stiffener that consists of pre-impregnated carbon/epoxy, the expansion coefficient of the first part 26 is on the order of alpha=3.19 (° K×0.1).

The second part 28 comes in the form of a band that extends from one end to the other of the stiffener.

Based on the geometry of the cavity, the first part 26 can come in the form of a band when the panel is flat or can have a shape that is suitable for that of the surface of the panel in the case of, for example, a release of folds.

The two parts 26 and 28 can move translationally relative to one another in the longitudinal direction so as to remove the two parts one after the other.

According to one characteristic of the invention, at a transverse cross-section, the surface that is occupied by the first part 26 corresponds to at least 75% of the surface of the cavity 18, whereas the second part 28 corresponds to less than 25% of the surface of the cavity 18. Advantageously, the ratio is 85% for the first part 26, and 15% for the second part 28.

This ratio between the first part and the second part makes it possible to obtain a good compromise between the limitation of the deformation by expansion of the core and an adequate contraction of the second part 28 to allow its extraction.

As illustrated in FIG. 1A, in the case of a panel with an undercut shape 22 of depth E, the second part 28 is to have a thickness of greater than E to allow the extraction of the core.

According to one embodiment, the first part 26 is made of foam so as to be flexible enough optionally to assume the curved profile of the panel, while ensuring that the stiffener holds its shape before and during polymerization.

The foam offers the advantage of having a slight expansion relative to solutions of cores made entirely of silicone or elastomer that cause, by expansion, a deformation of the stiffener or the panel.

The foam that is used for the first part 26 is to be thermally stable, and the pressure is to be withstood during polymerization. Preferably, the foam is of the polymethacrylimide type. Advantageously, it has a density that is greater than or equal to 95 Kg/m³ for withstanding pressure.

By way of example, the first foam part ensures the behavior of geometric shapes of the stiffener during a polymerization at 7 bar at 180° C. for 2 hours.

Advantageously, the foam that is used is to have a fine grain size to prevent marking the parts in contact (stiffener or panel) that would have a detrimental effect on demolding.

The first foam part 26 has an essentially constant trapezoidal cross-section over its entire length.

Preferably, the first foam part 26 is covered by polytetrafluoroethylene 30 so as to prevent, on the one hand, the foam cells from causing imprints in the pre-impregnated part, and, on the other hand, to prevent the adhesion of the resin to the foam.

This polytetrafluoroethylene coating 30 has a thickness on the order of 0.17 mm.

FIGS. 3A and 3B show a mode for manual deposition of the polytetrafluoroethylene coating 30 on the first foam part 26. Preferably, an adhesive polytetrafluoroethylene coating is used.

In a first step, the polytetrafluoroethylene coating 30 is applied to the first foam part that rests on its large base, as illustrated in FIG. 3A.

Next, after the turning of the first part, the coating flanges 30 are flattened against the large base of the foam part 26. The coating flanges overlap slightly.

Finally, the unit is compacted so as to limit the risks of deformations by expansion. By way of example, a compacting of the unit for 5 nm with a vacuum of 0.85 mbar is implemented.

The second part 28 comes in the form of an elastomer band that preferably contains silicone.

By way of example, this band has a thickness on the order of 3.2 mm.

The second part has an adequate elongation coefficient for allowing demolding and for obtaining adequate contraction of the cross-section during a longitudinal traction that is exerted on said second part.

To obtain optimum operation, the second part is to have an elongation coefficient that is greater than or equal to 600%.

According to one embodiment, the second part has an elongation coefficient of 650%.

According to one characteristic of the invention, when the panel 10 comprises an undercut shape 22, the second part 28 is flattened against the panel and assumes the shape of the panel using its flexibility.

The core 24 comprises at least a second part 28 that is flattened against the panel and/or the stiffener comprising an undercut shape.

Advantageously, the two parts 26 and 28 of the core extend beyond the stiffener at least one of its ends so as to be able to grip the two parts to extract them from the stiffener.

By way of example, at one end of the stiffener, the projection of the first part is on the order of 50 mm and that of the second part is on the order of 100 mm.

When the stiffener has a significant length, greater than 4 m, the first part 26 can be made in several sections arranged one after the other. In all of the cases, the second part is to be produced by a single support to prevent defects at junctions and to facilitate extraction.

The method for installing a stiffener on a panel is now explained relative to FIGS. 1A to 1D.

The core 24 is installed on the panel, whereby the second part 28 is flattened against said panel. The stiffener is added to the core 24, as illustrated in FIG. 1A.

After polymerization, the second part 28 is removed from the core by exerting traction on one of its ends, as illustrated in FIG. 1B.

The traction that is exerted creates an elongation of said second part 28 and a contraction of the cross-section of said second part 28, in particular at the undercut shape.

As illustrated in FIG. 1C, with the second part 28 being removed, the first part 26 can be removed from the cavity by pulling it from one of its ends as illustrated in FIG. 1C.

A stiffener that is made integral with a panel, as illustrated in FIG. 1D, is then obtained.

It is noted that the core makes it possible to obtain a scooped-out stiffener.

The core according to the invention makes it possible to obtain the required geometric precision using the first part, its removal being made possible using the second part. In addition, it does not result in defects at the aerodynamic surface.

It can be used during the implementation of a stiffener and a panel that are not completely polymerized (crude), polymerized during the same cycle in the presence of the core, or with at least one of these two elements being polymerized prior to the installation of the core.

The core can be used for non-flat panels and makes it possible to obtain stiffeners of great lengths.

Finally, the use of the core is relatively simple and does not require complex equipment.

The invention claimed is:

1. A method for the production of a stiffener on a surface of an element that is to be made rigid, wherein at least one of the stiffener and the element to be made rigid comprises a composite material that is not completely polymerized, wherein the stiffener comprises in a transverse direction two contact zones with the surface, and between the two contact zones the stiffener and the element to be made rigid form a cavity that is open at at least one end of the stiffener, said method comprising:
   polymerizing at least one of the stiffener and the element with a core positioned in said cavity; and
   removing the core from the cavity after polymerization;
   wherein the core comprises a first part contacting a first region of an inner surface of the cavity, said first part having a thermal expansion coefficient less than that of the stiffener, and at least one second part contacting a second region of said inner surface of the cavity, whose configuration and elongation percentage permit the second part to be withdrawn from the cavity by pulling on one end of the second part so as to cause a decrease in its cross-section,
   wherein the surface of the element that is to be made rigid has an undercut shape of depth E, and wherein the second part has a thickness greater than E.

2. The method according to claim 1, wherein the second part has an elongation percentage that is greater than or equal to 600%.

3. The method according to claim 1, wherein at a transverse cross-section, the first part covers at least 75% of the surface of the cavity, whereas the second part occupies less than 25% of the surface of the cavity.

4. The method according to claim 1, wherein the second part of the core contacts the surface of the element that is to be made rigid so as to cover the undercut shape.

5. The method according to claim 1, wherein the first part comprises at least a core made of foam.

6. The method according to claim 5, wherein the foam is a polymethacrylimide.

7. The method according to claim 5, wherein the foam has a density that is greater than or equal to 95 kg/m$^3$.

8. The method according to claim 5, wherein the first part comprises a covering of polytetrafluoroethylene.

9. The method according to claim 1, wherein the second part is made of elastomer.

10. A method for forming a stiffener on a surface of an element that is to be made rigid, wherein at least one of the stiffener and the element to be made rigid comprises a composite material that is not completely polymerized, comprising:
    positioning the stiffener and a core on the element to be made rigid, wherein the stiffener comprises in a transverse direction two contact zones with the surface, and between the two contact zones the stiffener and the element to be made rigid form a cavity that is open at at least one end of the stiffener, and wherein the core is positioned in the cavity;
    wherein the core comprises a first part contacting an interior surface of the stiffener and at least one second part contacting an interior surface of the stiffener;
    polymerizing at least one of the stiffener and the element; and
    removing the core from the cavity after polymerization;
    wherein the core is removed from the cavity by pulling on one end of the second part, the second part having a configuration and elongation percentage that permit the second part to be withdrawn from the cavity by pulling on one end of the second part so as to cause a decrease in its cross-section, and removing the first part from the cavity after the second part has been removed from the cavity,
    wherein the surface of the element that is to be made rigid has an undercut shape of depth E, and wherein the second part has a thickness of greater than E.

11. The method according to claim 10, wherein the first part comprises a material having a thermal expansion coefficient that is less than that of the stiffener.

12. The method according to claim 10, wherein the second part has an elongation percentage that is greater than or equal to 600%.

13. The method according to claim 10, wherein at a transverse cross-section, the first part occupies at least 75% of the surface of the cavity, whereas the second part occupies less than 25% of the surface of the cavity.

14. The method according to claim 10, wherein the first part comprises at least a core made of foam.

15. The method according to claim 14, wherein the foam is a polymethacrylimide.

16. The method according to claim 14, wherein the first part comprises a covering of polytetrafluoroethylene.

17. The method according to claim 10, wherein the second part is made of elastomer.

18. The method according to claim 10, wherein the second part contacts the surface of the element that is to be made rigid, in a region between the two contact zones of the stiffener.

* * * * *